3,257,220
METHOD OF MANUFACTURING CALCIUM
SILICATE INSULATING MATERIALS
George L. Kalousek, Gary, Ind., and Dana L. Bishop, Granville, and Richard F. Shannon, Lancaster, Ohio, assignors to Owens-Corning Fiberglas Corporation, a corporation of Delaware
No Drawing. Filed Nov. 4, 1963, Ser. No. 321,356
18 Claims. (Cl. 106—120)

The present invention relates generally to hydrous calcium silicate insulating materials. More particularly, the present invention relates to an improved method or process of manufacturing these hydrous calcium silicate insulating materials.

The hydrous calcium silicate insulating materials are known to be formed by reacting lime, a crystalline form of a source of silica, water, and perhaps other ingredients, under indurating conditons, e.g., involving elevated temperatures and saturated steam pressures, and preselected ratios of lime and silica to yield, after a given time interval, a dry, solid, relatively light (ranging from 3 to 50 pounds per cubic foot) product which is of insulative character and therefore of utility as an enclosure or covering for pipes carrying materials desirably protected against the environmental atmospheric conditions. The materials are also useful as a solid block of material or as core materials for a variety of applications in the construction field, generally where heat insulation properties are necessary. The hydrous calcium silicate insulating materials are conventionally formed by initially preparing a slurry of the lime, silica and water together with additional materials, for example, fibrous asbestos, limestone, clay, etc. The slurry of lime, silica, asbestos and water is ultimately exposed to an induration cycle sufficient to effect a reaction of the lime and silica to form an integrated crystalline product which is possessed of the desirable heat insulating properties and, as well, a mechanical strength coupled with low density properties. As will be described hereinafter, the reactants are generally included in such proportions that the ultimate product of the induration cycle is possessed of a very advantageous and desirable low coefficient of heat transfer ($K=0.50$ B.t.u./(hr.) (ft.$^2$) (°F./ft.) at 500° F. mean) coupled with structural integrity at relatively elevated temperatures, for example, above 1,000° F. extending to 1700°–1800° F. and above with particular proportions. The slurry mixture of reactants is usually prepared in batch quantities and thereafter introduced into shallow pans defining the slab form of insulative product or, alternatively, introduced into shallow molds having a contour defining the structural piece desired. Thus, the slurry may be introduced into shallow pans to form a slab of the material upon completion of the induration cycle or it may be introduced into a mold having a depressed cavity which is generally semi-cylindrical in contour. In the latter instance, a semi-cylindrical core insert is located in registering relationship with the cavity in the mold and in spaced relationship therewith whereby there is defined therebetween an elongate arcuate chamber. The resultant dried induration product formed therein defines a half of a pipe enclosure. Two of such sections in their ultimate dried form are of utility in embracing a cylindrical pipe carrying a product which is desirably insulated from the surrounding environment. Steam pipes are illustrative of the conduits for which the hydrous calcium silicate materials are ideally suited as insulating coverings, preventing lowering of the temperature of the steam carried therewithin.

The slurry of reactants, of necessity, includes a considerable proportion of water in order to achieve a product of desirable low density. Consequently, it has been found that the aqueous slurry contained in the shallow pan or mold is beset with the problem of loss of water due to the jostling, spilling and splashing of the slurry as the pan or mold is moved about in its progress from the slurry mixing step to the ultimate induration cycle. Manufacturing techniques practiced at the present time are also found to involve a loss of water from the mold at the location of the core inserts. The loss of water in the aqueous slurry leads to the formation of discontinuities in the ultimate induration product which constitute planes of weakness detracting from the structural strength of the parts and sections formed thereof. Loss of water from the pans or semi-cylindrical molds is very undesirable since the ratio of water to the lime and silica reactants can adversely affect the density of the ultimate dry induration product.

It is also found that the shifting of the slurry in the mold as the latter is moved about the processing area results in dimensional variation as to the thickness of a given slab, etc., whereby the whole slab must be scrapped.

The density of the insulating materials of this invention is desirably low considering the length of horizontally disposed steam pipes in many installations. The higher the density, of course, the more auxiliary supporting members must be employed to maintain the insulative covering of hydrous calcium silicate covering.

One quite serious problem encountered in the formation of the integrated, dry, hydrous calcium silicate insulating materials involves the removal of the dry formed product from the pan or mold. Thus, very frequently it is found that the product does not separate from the pan or mold whereupon applied force results in breakage, cracking, etc. This, of course, is highly undesirable.

Present manufacturing techniques of the induration reaction of the slurry are also beset with the difficulty that the sudden exposure of the aqueous slurry to the elevated temperatures results in a flashing, or what may be termed as a sudden ebullition, of the aqueous phase of the slurry. When this occurs, that is, the ebullition or sudden boiling on exposure to elevated temperature conditions, the stable quiescent conditions under which induration is desirably conducted is interrupted, frequently leading to an unacceptable and non-uniform product.

Accordingly, it is an object of the present invention to provide a method wherein the foregoing difficulties are overcome.

It is a particular object of the present invention to provide a process of preparing a slurry from lime and silica as principal ingredients and, as well, including other ingredients wherein splashing and spilling of the slurry as contained in the container defining the ultimately formed product is substantially avoided and more frequently eliminated altogether.

It is another object of the present invention to provide a method and a technique of utility in the preparation of the slurry whereby the escape of water from the slurry is avoided altogether, thereby eliminating formation of planes of discontinuity.

It is still another object of the present invention to provide a method, of slurry preparation involving the mixture of lime, silica and water, which obviates the sudden boiling or ebullition of the water phase upon exposure to elevated temperature conditions sometimes encountered in the initial reaction of the lime, silica and water.

It is a principal object of the present invention to provide a method of slurry preparation involving a prescribed introduction of a prehardening agent which effects a preliminary setting up of the slurry, that is, a sudden increase in viscosity, whereby the difficulties enumerated hereinabove are effectively eliminated.

It is an additional object of the present invention to provide a technique for effecting a prehardening of the slurry whereby water loss, spillage and boiling under high temperature conditions are all avoided without any detrimental effect on the properties of the ultimate hydrous calcium silicate insulating material product.

It is still another object of the present invention to provide a method of preparing a slurry which, by a novel cooperation of ingredients in appropriate amounts, results in a slurry mass which undergoes a slight and controlled shrinkage leading to easy removal of the final formed product from the pans, molds or the like.

It is likewise an object of the present invention to provide a process technique wherein the avoidance of the problems referred to hereinabove is accomplished in a manner which is compatible with conventional processes of manufacturing hydrous calcium silicate insulating materials and, additionally, does not require extensive modification of these processes or material changes in the formulations which have been evolved in the past.

The foregoing as well as other objects of the present invention will become apparent to those skilled in the art from the following, rather detailed, description taken in conjunction with the recitation of specific examples which are included herein in compliance with the patent statutes as disclosive of preferred embodiments of the practice of the invention.

Viewed in its simplest and most basic form, the present invention envisions the incorporation of a silica sol in the slurry of lime, silica and water; the sol being a generally turbid liquid-containing colloidal silica ($SiO_2$) of extremely fine particle size ranging, for example, from 70 to 10,000 Angstrom units. Most desirably, the silica sol is substantially free of fluxing cations, such as sodium, potassium and lithium. The silica sol useful as a prehardening agent in accordance with the present invention should measure from about 8 to 30% solids and should ideally fall within a prescribed range of pH. Thus, the silica sol should fall within the pH range of from above 8 to about 11. A silica sol in the pH range of from 4 to 8 is not useable in the practice of the present invention, since a sol in such pH range has been found to be unstable since the sol in this pH range is subject to premature gelation and, therefore, leads to unpredictable prehardening of the aqueous slurry. A sol of silica, having the above-described properties or character, is and may be included in the preformed aqueous slurry prepared at room temperature in amounts ranging from about 1 to 8% of the other slurry components on a solids basis.

Before embarking on a detailed description of the precise and most preferred manner of practicing the present invention, but bearing in mind that the practice of the invention is dependent upon such, it should be pointed out that there are a number of considerations involved in the preparation of the aqueous slurry and the subsequent processing thereof to form the ultimate reaction product, constituting a solid, integrated, generally porous, microcrystalline product. In the first place, of a necessity, the reactants must be present in a carefully predetermined and controlled ratio. If the ratio of lime and silica, for example, is not maintained within rather critical limits, the induration or reaction will not proceed properly to the formation of a useful, microcrystalline structure having utility as an insulating material. Additionally, the ratio of the solids, including lime, silica and asbestos fillers, to the water component must also be carefully controlled since the product must additionally fall within a range of density in order to have satisfcatory strength coupled with thermal performance. Furthermore, the process must be carried out under carefully controlled conditions and no additive must be included which might tend to cause the slurry, either under atmospheric conditions or during the induration cycle, to experience foaming, bubbling or ebullition which otherwise would lead to the formation of discontinuities and, in particular, voids.

In general, in forming the initial slurry of lime, silica and water, the lime and silica are combined in a particular relative ratio; the choice of which will determine the character of the product. Usually the lime and silica are combined in the ratio of at least 0.65 mol of lime (CaO) to 1.0 mol of silica ($SiO_2$) in order to produce a crystalline integrated form of calcium silicate insulating material. Molar ratios of lime and silica in the order of 0.83 to 1.0, respectively, yields a product upon completion of the induration cycle having the structure of tobermorite, having the formula $4CaO \cdot 5SiO_2 \cdot 5H_2O$. When, on the other hand and most desirably, the lime and silica is adjusted to fall within the mol ratio of 4:5 to 5:5 (lime/silica) and, at the same time, the water component of the slurry is initially saturated with respect to the lime and has been so maintained, then the product involving a continuous dissolution of the lime and a continuous reaction thereof with the silica component will proceed to yield an initial product having the formula $2CaO \cdot SiO_2 nH_2O$, which converts through a sequence of reactive hydrous silicates of lime to the formation of tobermorite having the product formula hereinabove indicated. Finally, the latter will convert to a crystalline xonotlite form having the formula $5CaO \cdot 5SiO_2 \cdot H_2O$. The tobermorite is characterized by a generally plate-like crystalline structure, while xonotlite is characterized by long, thin, lath-like crystals. In either event, the structure, whether tobermorite or xonotlite, is characteristically of open, porous and crystalline structure. The product is strong and resilient while, at the same time, is refractory to high temperatures and is of consistent, uniform, low heat conductivity throughout. The xonotlite form of hydrous calcium silicate insulating material contains, as can be seen, less water of hydration than the tobermorite and is more dimensionally stable at high temperatures and is relatively chemically inert. The practice of the present invention, that is, the accomplishment of prehardening and the avoidance of the difficulties of problems enumerated hereinabove, is most effective and the results most pronounced in the case of the manufacture of a microcrystalline insulating material composed principally of xonotlite. In other words, the practice of the invention is most outstanding in terms of prehardening and controlled shrinkage where the slurry ingredients are adjusted at the beginning so as to fall within the range of lime/silica (*C/Si*) ratios of from 4:5 to 5:5. As indicated hereinabove, the slurry reactants once they have been initially mixed in the prescribed proportions are generally, without further processing, poured into the shallow container defining the contour of the solid product as ultimately desired. In accordance with the present invention, we include in the slurry a prescribed amount of a silica sol, generally so as to constitute from about 1.0 to 8.0% and preferably about 5% on a solids basis. In accordance with the present invention, the silica sol additive which accomplishes the desired prehardening may take one of several forms. It may be noted here that the general characteristics of the silica sol have been enumerated previously herein. The silica sol in a preferred embodiment of the present invention constitutes an alkali metal (sodium, potassium or lithium) silicate solution which has been deionized, that is, the alkali metal removed. Sodium silicate is available in the range 1.0 $Na_2O$–1.0 $SiO_2$ to 1.0 $Na_2O$–4.1 $SiO_2$. Most conveniently, considering the cost and removal aspect, it is usually most desirable to employ a sodium silicate having a molecular composition 1.0 $Na_2O$–3.3 $SiO_2$. This sodium silicate measures about 37.5% solids and is characterized as a 40° Bé solution. In accordance with a preferred technique, the deionized sodium silicate is prepared by first diluting a commercial sodium silicate (1.0 $Na_2O$–3.3 $SiO_2$) to about a 10% solids solution. The 10% solids solution is then deionized to effect substantial removal of sodium ions and replacement thereby with $H^+$ ions. Deionization may be accomplished, for example, by passing the 10% solids sodium silicate through an ion exchange column containing a cationic-type resin, representative of which is Amberlite IR/120 and Dowex 50/X8. These cationic-type nuclear ion exchange resins are essentially sulfonated vinyl benzene cross linked with divinyl benzene. In the passage of the sodium silicate solution through the ion exchange column, the sodium ions thereof are collected while hydrogen ions are given up by the ion exchange resin, yielding a hydrogen ion containing silicate having the probable formula $H^+ \cdot SiO_2^-$. The preparation of deionized sodium silicate, constituting a preferred effluent silica sol additive to effect prehardening in accordance with the present invention, is described in U.S. Patent No. 3,083,167 assigned to the same assignee as the present application; the disclosure of which is incorporated herein by reference.

The effluent from the ion exchange column measuring about 8% solids may be reintroduced into a regenerated ion exchange column together with additional sodium silicate to effect concentration of the silica sol to a percent solids higher than 8% and depending upon the number of cycles achieving a percent solids approaching 20%. Techniques for achieving concentration are described in considerable detail in the referred to U.S. Patent No. 3,083,167 together with regeneration and back washing techniques. Usually, the first effluent is combined with additional sodium silicate to, in effect, increase the silica sol concentration in the succeeding effluent. The effluent from an initial passage of a sodium silicate solution of about 10% through the cationic ion exchange resin bed will measure a pH in the vicinity of 2 to 3.

The effluent may be introduced to the aqueous slurry of lime, silica and water in this condition and thereafter exposed to a temperature of about 200° F., whereby a substantial increase in viscosity will be noted. The effluent, on the other hand, may be desirably maintained for later use as an additive to a slurry of lime and silica reactants by adding thereto an additional amount of sodium silicate and ammonia to adjust the pH rapidly upwards through the unstable range 4.0 to 8.0 to a stable pH of above 8.0 and ranging through to about 11.0. The silica sol which has been adjusted to a pH in the range 8.0 to 11.0 is relatively stable and may be maintained for future utilization in the preparation of hydrous calcium silicate insulating materials as needed.

A conventional hydrous calcium silicate forming slurry within the confines of the present invention is prepared from the ingredients listed below in Table 1, together with the amounts thereof in parts by weight.

Table 1

| Ingredients: | Parts by weight |
|---|---|
| Tripoli (99% SiO₂) | 1,000 |
| Lime (94% CaO) | 1,000 |
| Asbestos (fibrous chrysotile) | 800 |
| Water | 13,500 |

A slurry mixture is prepared of ingredients in the weight proportions noted in Table 1. Simultaneously, there is prepared a deionized sodium silicate by introducing a dilute (10%) sodium silicate solution through a cationic-type ion exchange column containing particles of Dowex 50/X8, a sulfonated vinyl benzene resin cross linked with divinyl benzene. The quantity of dilute sodium silicate passed through the ion exchange column is carefully controlled so that the efficiency of the bed is not disturbed. The effluent deionized silica sol measures about 8% solids. A quantity thereof is combined with the prepared slurry in such proportion that the effluent constitutes about 5% by weight on a solids basis and so calculated as to not disturb the solids/water ratio of the initial slurry as enumerated in Table 1. Thus, about 1400 parts of effluent, measuring about 8 to 10% solids, is added to the slurry of Table 1. The slurry is next poured immediately into a shallow pan, defining the ultimately desired solid product. An immediate increase in viscosity is noted upon subjecting the slurry containing the silica sol to a temperature in the neighborhood of about 150° F. No superatmospheric pressure is necessary to effect an increase in the viscosity. The shallow pans can now be moved about as encountered in actual manufacturing operations without any spillage or any water loss, since the slurry has been converted to a semi-hardened state. The pans containing the prehardened slurry are introduced to an autoclave wherein a temperature of 203° C. (397° F.) and a pressure of 225 pounds per square inch gauge is maintained. This precise temperature and pressure condition for the induration cycle may be varied, of course, depending upon the cross sectional thickness of the prehardened slurry mixture. One phenomena encountered in the induration cycle involves the temperature initiation of removal of excess water. By excess water is meant that which does not enter into the reaction of the principal slurry ingredients, e.g., lime and silica. This occurs gradually, whereupon the hydrous calcium silicate body commences to form by reaction of the lime and silica, passing, most preferably, through the stages as enumerated hereinabove, reaching a stage representing a crystalline tobermorite and ultimately a xonotlite having the formula as indicated. Continued exposure to the temperature and pressure conditions ultimately results in a formed, dry, solid, microcrystalline product having a measured density of about 12 pounds per cubic foot. The product is structurally sound and is refractory, that is, resistant to temperatures in excess of 1,000° F. without undergoing thermal degradation.

In accordance with a preferred embodiment of the present invention, the silica sol effluent representing a deionized commercial sodium silicate, representing from 8 to 35% solids, is first combined with a minor amount of lime (CaO). Preferably, the lime is combined with the silica sol effluent in an amount representing about ¼ thereof on a solids basis. Thus, for each 100 parts of deionized silica sol on a solids basis, we desirably prereact therewith 25 parts of lime. This lime-silica sol composite is then immediately combined with the aqueous slurry mixture and thereafter introduced into a shallow pan or mold, whereupon it is exposed to a temperature in the neighborhood of 150 to 210° F., effecting an immediate increase in viscosity whereby loss of water and spillage losses due to jostling of the container or mold is avoided. Once prehardening has been effected in accordance with the preferred technique of the present invention, the slurry is found to have the consistency of an extremely thick cream. It is almost jell-like in physical consistency, whereupon an aqueous phase is noticeably absent. As a consequence, the chance of loss of water on exposure to elevated temperatures is obviated. As a collateral result of the practice of the present invention, it is found that the induration, e.g., the progress of the reactants through the several stages leading ultimately to the dry integrated micro-crystalline structure, is achieved much more uniformly and with a minimum of process difficulties. Finally, it is found that the final dried product is removed easily from the pan or mold half without prying and consequent cracking and breakage.

The prehardening of the deionized sodium silicate containing slurry may occur generally upon exposure to a temperature of from 150–210° F. For best results it is preferred to employ a temperature in the range of 180° F. to 210° F. Thus, we find that the shrinkage phenomenon is more uniform and controlled where this range of prehardening temperatures is observed.

The combination of the lime and the deionized silica sol effluent is preferably controlled so that the lime constitutes from 5% to 200% of the silica sol effluent. Most preferably, the lime amount is selected to constitute about 25% by weight of the silica sol effluent.

Induration of the slurry mixture of lime, silica and water and, additionally, the dionized sodium silicate prehardening agent can be effected in a fairly wide range of temperatures and corresponding saturated pressures. Thus, a temperature range of from 140° C. (284° F.) to 250° C. (482° F.) may be effectively utilized, making necessary adjustments in the time cycle of exposure. Pressures of induration are always those associated with the temperature selected, but may be varied from 75 to 400 pounds per square inch. In choosing the desired temperature and pressure condition, the operator selects a combination as to insure the presence of moisture.

The final hydrous calcium silicate insulating material may be produced in a fairly wide range of densities, e.g., from 3 pounds per cubic foot to 50–60 pounds per cubic foot. This is accomplished by proper selection of the water to solids ratio, wherein the solids equal the sum of the amounts of silica, lime, solids, clay, miscellaneous filler, etc. A water to solids ratio of about 3 to 1 will yield an approximately 21 pounds per cubic foot (p.c.f.) product. A ratio of 1.0 to 1.0 (water/solids) will yield a product of about 50 p.c.f., while a ratio of 9.0 to 1.0 (water/solids) yields an extremely low density product, e.g., about 3 p.c.f.

The asbestos component of the slurry formulation is usually selected from the fibrous types of asbestos, since these function admirably as suspending agents, preventing the settling of the solids of the lime and silica, maintaining proper dispersion thereof throughout the slurry until prehardening can be effected as in accordance with the technique of the present invention as set forth herein. Additionally, the asbestos fibers dispersed throughout the mass provide a reinforcement of benefit to structural integrity.

As indicated, the phenomenon of controlled shrinkage achieved by the preparation of the slurry as described herein reduces the breakage frequently encountered in removal of the product from the pan, mold, etc. It also avoids the necessity of using spacer inserts formed of paper, etc., which have been employed in the past in attempts to reduce the cracking and breakage attendant removal of the product from the mold or pan.

It is, of course, possible within the scope of the present invention to accomplish the induration cycle in a step separate from an ultimately and final drying step. In such situation, where desired, the induration is carried out for a time sufficient to effect reaction through the intermediate phases to the formation of the final integrated crystalline structure, but short of removal of the entire amount of moisture. Thereafter, the product contained in the molds or shallow pans may be removed and introduced into a mild hot air oven for a more lengthy, but less vigorous, drying cycle at atmospheric pressures.

While the silica sol, representing the effluent of a cationic-type ion exchange column and to which is introduced a sodium silicate solution, represents a preferred and most desirable practice of the present invention in terms of results and overcoming of the difficulties enumerated hereinabove, it has been found that several commercial colloidal silica materials may be utilized. One such colloidal silica material is marketed under the tradename "Ludox" by the Grasselli Chemicals Department of the E. I. du Pont de Nemours & Co., Inc., Wilmington, Delaware. The colloidal silica materials marketed under the tradename "Ludox" are described more fully as to their character and methods of manufacture in U.S. Patent Nos. 2,574,902 and 2,577,485. Still another silica sol material, which is available commercially and which may be used in the practice of the present invention, is marketed under the tradename "Syton" by the Monsanto Chemical Company. Similar commercial products which can, under certain circumstances, be utilized to effect prehardening of aqueous lime-silica-water slurries are "Silene EF," a product of Columbia-Southern Chemical, a subsidiary of Pittsburgh Plate Glass Company, and a silica alumina material marketed under the tradename "Zeosil," a product of the Huber Clay Company. The latter two materials are not as desirable as the deionized sodium silicate solutions described in detail hereinabove by reason of their included chloride content which is found to be undesirable and results in an unacceptable product in terms of many performance characteristics, such as insufficient prehardening. The product "Zeosil" is also most undesirable in the production of the xonotlite form of crystalline hydrous calcium silicate since it contains a fair percentage of $Al^{+++}$ which precludes the formation of xonotlite.

The use of as little as 2% by weight of a deionized silica sol in accordance with this invention can result in a degree of prehardening, permitting reduction in the amount of a sometimes used silica source (diatomaceous earth) which, although it contributes to prehardening, is frequently undesirable.

In Table 2 a slurry formulation, inclusive of diatomaceous earth, is set forth.

*Table 2*

|  | Lbs. |
|---|---|
| Quicklime | 717 |
| Tripoli (99% silica) | 370 |
| Celatom (diatomaceous earth—83% silica, remainder alumina) | 850 |
| Clay (40% silica) | 100 |
| Asbestos | 500 |
| Water | 16,000 |

A slurry prepared from the above ingredients, when subjected to indurating conditions, will yield a tobermorite, thereby reflecting lower molar ratio of lime/silica (about 0.65:1.0) in the reactants. Addition to the slurry formulation of Table 2 of about 2% by weight of a silica sol effluent representing a deionized sodium silicate permits a reduction in the celatom content (diatomaceous earth) to about 600 lbs., instead of 850 lbs. This lower celatom formulation, coupled with the addition of the deionized silica sol, will yield a product exhibiting a very low and desirable rate of shrinkage in the mold or shallow pan whereby it may be easily removed therefrom without attendant loss due to breakage. The shrinkage will be found to be a controlled type of shrinkage, that is, it will not be accompanied by any loss of strength or thermal properties.

While there has been disclosed hereinabove preferred formulations, techniques and modes of operation, it is intended that the invention is not necessarily limited thereto, unless a broader interpretation would violate the scope defined in the appended claims.

We claim:

1. The method of producing a hydrous calcium silicate insulating material which comprises preparing an aqueous slurry including lime and silica in relative molecular proportion ranging from about 0.65 to 1.1 mol of CaO to 1.0 mol $SiO_2$, adding thereto an aqueous silica sol constituting a deionized alkali metal silicate, said sol being added in an amount ranging from about 1 to 8% by weight of the total slurry solids on a solids basis, locating said slurry in a container definitive of the contour desired for the final solid material, subjecting the slurry to a temperature of from 150° F. to 210° F. for from about 1 hour to about 2½ hours and subjecting said slurry to steam induration including a temperature of at least about 140° C. and a pressure of at least about 75 pounds per square inch.

2. The method of producing a solid hydrous calcium silicate insulating material which comprises preparing an aqueous slurry including lime and silica, said slurry including lime and silica in relative molecular proportion ranging from about 0.65 to 1.1 mol of CaO to 1.0 mol $SiO_2$, adding thereto an aqueous silica sol constituting a deionized alkali metal silicate solution measuring from about 8.0 to 35.0% solids, said sol being added in an amount ranging from about 1 to 8% by weight of the total slurry solids on a solids basis, locating said slurry in a container definitive of the contour desired for the final solid material, subjecting said slurry to a temperature within the range 150° F. to 210° F. for a time, effecting controlled prehardening of said slurry and subjecting said confined slurry to steam induration including a temperature of at least about 140° C. and a pressure of at least about 75 pounds per square inch.

3. The method of producing a solid hydrous calcium silicate insulating material which comprises preparing an aqueous slurry of lime, silica and water, said slurry including lime and silica in relative molecular proportion ranging from about 0.65 to 1.1 mol of CaO to 1.0 mol $SiO_2$, adding thereto an aqueous silica sol comprising a sodium deionized sodium silicate solution, said sol being added in an amount ranging from about 1 to 8% by weight of the total slurry solids on a solids basis, locating said slurry in a container definitive of the contour of material desired, heating said slurry to effect a controlled prehardening of said slurry and subjecting said confined slurry to steam induration including a temperature of at least about 140° C. and a pressure of at least about 75 pounds per square inch.

4. The method of producing a hydrous calcium silicate insulating material which comprises preparing an aqueous slurry including lime and silica in relative molecular proportion ranging from about 0.65 to 1.1 mol of CaO to 1.0 mol $SiO_2$, adding to the slurry a mixture of an aqueous silica sol and lime, said sol constituting a deionized alkali metal silicate, said mixture being added in an amount proving 1 to 8% of silica sol on the basis of total slurry solids, locating said slurry in a container definitive of the contour desired for the final solid material, subjecting the slurry to a temperature of from 150° F. to 210° F. for from about 1 hour to about 2½ hours and subjecting said slurry to steam induration including a temperature of at least about 140° C. and a pressure of at least about 75 pounds per square inch.

5. The method of claim 1, wherein the aqueous silica sol additive is maintained within the pH range of from 2.0 to 4.0.

6. The method of claim 1, wherein the aqueous silica sol additive is maintained within the pH range of from 8.0 to 11.0.

7. The method of claim 5, wherein said silica sol additive is characterized by an average particle size of from 70 to 10,000 Angstrom units.

8. The method of claim 4, wherein the aqueous silica sol additive is maintained within the pH range of from 2.0 to 4.0.

9. The method of claim 4, wherein the aqueous silica sol additive is maintained within the pH range of from 8.0 to 11.0.

10. The method of producing a dry, solid, hydrous calcium silicate insulating material which comprises (1) deionizing an aqueous alkali metal silicate solution to form a substantially cation-free sol of silicon dioxide, said sol constituting from about 8 to 35% solids and having a pH below 6.0, (2) preparing an aqueous slurry of lime and silica present in relative mol proportion of 0.90 to 1.1 mol of CaO to 1.0 mol $SiO_2$ and the water/solids ratio falls within the range of 9:1 to 1:1, (3) adding an amount of said sol to said slurry sufficient to constitute 1 to 8% by weight of total slurry solids whereby the viscosity of said slurry increases, (4) locating said slurry in a container defining the ultimately desired contour of the insulating material, and thereafter, (5) subjecting said slurry to steam induration including an elevated temperature of at least about 140° C. and an above atmospheric pressure of at least about 70 pounds per square inch to thereby produce a dimensionally stable insulating material resistant to elevated temperatures.

11. The method of producing a dry, solid, hydrous calcium silicate insulating material which comprises (1) deionizing an aqueous sodium silicate solution to a substantially sodium-free sol of silicon dioxide, said sol constituting from about 8 to 35% solids and having a pH between 8.0 and about 11.0, (2) preparing an aqueous slurry of lime, silica and water having the lime and silica present in relative mol proportion of 0.90 to 1.1 mol of CaO to 1.0 mol $SiO_2$ and the water/solids ratio falls within the range of 9:1 to 1:1, (3) adding an amount of said sol to said slurry sufficient to constitute about 1 to 8% of total slurry solids, on a solids basis, whereby the viscosity of said slurry increases, (4) locating said slurry in a container defining the ultimately desired contour of the insulating material, and thereafter (5) subjecting said slurry to steam induration including an elevated temperature of at least about 140° C. and an above atmospheric pressure of at least about 70 pounds per square inch to thereby produce a dimensionally stable insulating material resistant to elevated temperatures.

12. The method as claimed in claim 11, wherein said deionized sol of silicon dioxide is combined with lime before adding to said slurry.

13. The method as claimed in claim 12, wherein said lime is added in an amount ranging from 5 to 200% of the weight of the sol on a solids basis.

14. In the production of solid hydrous calcium silicate insulating material wherein an aqueous slurry of lime and silica in relative molecular proportion of from 0.65 to 1.10 mol CaO to 1.0 mol $SiO_2$ is prepared, thence added to a container definitive of the contour desired for the final solid insulating material, and thereafter exposed to steam induration, involving an elevated temperature of at least about 140° C. and simultaneously an above atmospheric pressure of at least about 70 pounds per square inch, to yield the insulating material; the improvement which comprises prehardening said slurry prior to induration by adding to said slurry an aqueous silica sol constituting a deionized alkali metal silicate solution in an amount ranging from about 1 to 8% by weight of total slurry solids on a solids basis and exposing said slurry to a temperature, prior to steam induration, of from about 150° F. to 210° F. for a sufficient time to achieve at least a partial gelation, thereby precluding appreciable water loss by gravity or evaporation.

15. The method as claimed in claim 1, wherein said deionized alkali metal silicate is combined with lime befor adding to said slurry.

16. The method as claimed in claim 15, wherein said lime is added in an amount ranging from 5 to 200% of the weight of the deionized silicate on a solids basis.

17. The method as claimed in claim 2, wherein said deionized sol of silicon dioxide is combined with lime before adding to said slurry.

18. The method as claimed in claim 17, wherein said lime is added in an amount ranging from 5 to 200% of the weight of the sol on a solids basis.

References Cited by the Examiner
UNITED STATES PATENTS

| | | | |
|---|---|---|---|
| 2,547,127 | 4/1951 | Kalousek | 23—110 |
| 2,665,996 | 1/1954 | Kalousek | 23—110 |

TOBIAS E. LEVOW, *Primary Examiner.*

J. POER, *Assistant Examiner.*